United States Patent [19]

Warren et al.

[11] Patent Number: 4,468,767
[45] Date of Patent: Aug. 28, 1984

[54] DROP-AND-INSERT MULTIPLEX DIGITAL COMMUNICATIONS SYSTEM

[75] Inventors: Toney C. Warren, Clayton; Michael E. Hance, Concord, both of Calif.

[73] Assignee: Coastcom, Concord, Calif.

[21] Appl. No.: 328,316

[22] Filed: Dec. 7, 1981

[51] Int. Cl.³ .............................................. H04J 3/08
[52] U.S. Cl. ........................................ 370/55; 370/85
[58] Field of Search ................... 370/55, 29, 97, 86, 370/85

[56] References Cited

U.S. PATENT DOCUMENTS

| | | | |
|---|---|---|---|
| 2,740,838 | 4/1956 | Pierce | 370/55 |
| 3,665,405 | 5/1972 | Sanders et al. | 370/55 |
| 4,002,846 | 1/1977 | Barbier | 179/15 |
| 4,090,035 | 5/1978 | Popkin | 370/29 |
| 4,121,054 | 10/1978 | Popkin | 370/55 |
| 4,393,492 | 7/1983 | Bishop | 370/55 |
| 4,434,485 | 2/1984 | Huffman et al. | 370/55 |

FOREIGN PATENT DOCUMENTS 1118305  6/1968  United Kingdom .
1149072  4/1969  United Kingdom .

OTHER PUBLICATIONS

Telecommunications, Sep. 1973, pp. 44-44, "Single Channel Drop and Insert", by Canadian Marconi Co.

Primary Examiner—Douglas W. Olms
Assistant Examiner—Wellington Chin

[57] ABSTRACT

Apparatus for dropping and inserting digital data in a time division multiplexed, serial data stream. A communications link is divided into two spans with an electrical switch connecting the two spans. Data is used to derive channel-timing information defining the time divisions or strobes of each of the multiplexed channels. The strobe pulses are used to toggle the switch so that local transmit-and-receive channels may be inserted and dropped in accord with the channel strobe pulses. The same channel strobe pulses used for transmitting local data are used for receiving data from the multiplexed bit stream. In the absence of channel strobe pulses, the switch connects the two links.

10 Claims, 6 Drawing Figures

DROP-AND-INSERT MULTIPLEX DIGITAL COMMUNICATIONS SYSTEM

BACKGROUND OF THE INVENTION a. Field of the Invention

The invention relates to time division multiplex communications systems and in particular to a drop-and-insert scheme for such a system.

b. Prior Art

In point-to-point multiplex communications systems, involving serial data transmission, there is frequently a need to provide service to one or more users located along a communications path. Rather than provide separate facilities for such users to one of the points, it has been recognized that it is possible to provide one or more channels for these users which can be added to or subtracted from the system at the user location. These are known as drop-and-insert channels. In time division systems, a typical approach for a drop-and-insert scheme involves decomposition of all or portions of an entire data frame of the main channel consisting of multiple component channels with the accurate phasing of locally generated channels into the data stream.

An object of the invention was to devise a simplified drop-and-insert scheme for a time division multiplex communication system minimizing data processing, throughput delay and hardware complexity.

SUMMARY OF THE INVENTION

The above object has been achieved with a drop-and-insert scheme that uses data clock and channel strobes derived from the serial bit stream in a data span to operate local receive and local transmit digital channels synchronously with the serial bit stream, and to insert the transmit data by means of a logic switch which selects either the serial bit stream data or the locally generated data for the serial output. The switch allows local transmit data for a specified channel to override data in the serial bit stream.

The logic switch is connected between the data input and output terminals linking data spans and normally connects the input with the output. However, the switch is toggled by a channel strobe pulse and connected instead to a local transmit channel so that data in the local channel replaces any span data during the channel strobe pulse. A timing circuit, using a number of counters, generates channel strobe pulses from the data. A delay circuit is used to time the span data and the local transmit data such that both are synchronized. Any number of local transmit channels, up to the number of channels in a frame, may be inserted into the data stream. The same channel strobe pulses used for inserting transmit channels are used for dropping receive channels.

An advantage of the present invention is that complete decomposition of frames within the data stream is not required, although possible. A further advantage is that circuit complexity, hardware and processing delay are minimized.

DESCRIPTION OF THE PREFERRED EMBODIMENT

The following description is given with reference to a 24 channel pulse code modulation scheme, such as the carrier systems known as Western Electric T-1, GTE Lenkurt 9001B, ITT type T124 and Vicom T-1. The present invention is not limited to such systems, but for purposes of explanation a description which is compatible with these carrier systems is given. These systems include 24 component channels, each channel having eight pulses, including seven data pulses and a signalling pulse. These pulses usually encode an analog signal being transmitted, such as speech. The pulses can also encode a digital signal. Successive samples are used to reconstruct the signal. The 8 binary pulses in each channel have amplitudes for reporting, in binary code, the sampled signal amplitude. A typical frame length in time, including all 24 channels, is 125 microseconds. This means that the time slot occupied by each channel is approximately 5.2 microseconds wide.

Figure 1:
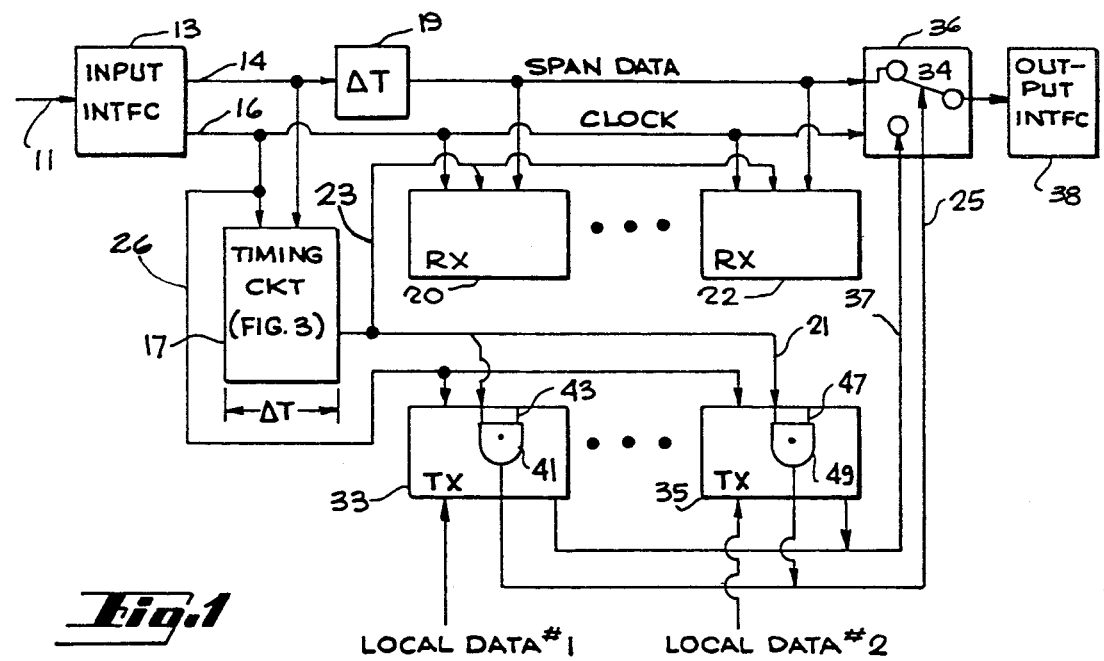
FIG. 1 is an electrical plan of the communications system of the present invention.

An overview of the present invention is described with reference to FIG. 1. In FIG. 1 the apparatus of the present invention is interposed in a serial data stream, linking two data spans. The two spans carry data in one direction only and the present invention is discussed only in terms of unidirectional data flow, i.e. simplex operation. Another two spans, not shown, carry data in the opposite direction for full duplex operation.

Serial digital data, arranged in frames, enters a receive interface unit 13 from a span 11 of a communications link. In the receiver, the span is properly terminated by an impedance matching network and incoming data is buffered and shaped, such as by a repeater. If the arriving data is in bipolar format, i.e., positive and negative pulses, or other format which encodes data and clock, the data is converted to unipolar pulses, preferably NRZ plus clock pulses. The receive interface unit 13, a data input means, includes a circuit for separating data from an encoded clock signal, where the clock interval is the data rate, say 1.544 MHz rate pulses. The data may have other rates as well. This clock signal will be used to clock all circuits in the device.

The separated data and clock signals are shown on lines 14 and 16. Both of these signals are applied to a timing circuit 17. Timing circuit 17, described below with reference to FIG. 3, recognizes the beginning of a frame and has counters to generate a separate strobe for each successive 8 bits of data, defining a channel, for 24 consecutive channels constituting a frame. The timing circuit counts data bits, as clocked with clock pulses, until the number of pulses constituting a channel occur. At this point the circuit produces a channel strobe pulse. The strobe pulse is a timing pulse which coincides with the time width of a component channel. There is some delay, $\Delta T$, introduced by the timing circuit 17. This must be compensated in order that the channel strobe pulses be properly phased within a frame. To provide for this, a delay circuit 19 is interposed in the main data path between spans to match the delay introduced by timing circuit 17. Delay circuit 19 is normally a shift register, providing a delay of 7 clock pulses for 8 bit channels. This is the time required for matching the delay in the channel strobe pulses generated in timing circuit 17. The channel strobe pulses which emerge from timing circuit 17 are applied via lines 21, 23 and 26 to other circuit members. Lines 23 connect the channel strobe pulses to each of the receive channel cards, 20 . . . 22, presenting one strobe line per channel card. Receive channel cards are provided only for those channels to be received locally. Complete local decomposition of data frames is not required. In other words, channel 1 is strobed only upon generation of a channel 1 strobe pulse in the frame timing circuit 17. The same strobe pulses applied to the receive channel cards 20 . . . 22 31, etc., are applied to the transmit channel cards 33 . . . 35. Transmit channel cards are provided only for those channels to be inserted locally into the data stream. Any number of local receive and transmit channel cards may be provided. up to the number of component data channels. For example, if 24 component data channels are provided in a frame, up to 24 receive and transmit channels, each associated with a card, can be provided. The receive channels, when strobed with a properly timed channel strobe pulse, provide reception of data within the receive channel. Receive and transmit channel cards may be inserted or removed without affecting other channels.

The transmit channels need not correspond in number to the receive channels, except that the maximum number of transmit channels may not exceed the number of component channels within a data frame. A transmit channel may be activated by one of the strobe pulses, in the same manner that a receiver is activated. As with the receiver cards, each of the local transmit channel cards is connected to one of the strobe lines. The strobe pulse delivered to the transmit channel card 33 in FIG. 1 is applied to logic gate 41. The output of this gate will follow the strobe output if the control signal along line 43 is a logic one. Then the output of gate 41 will be applied to line 25 and the data selector 34 will operate to select data from the local transmit channel 33 rather than the span data. Similarly, a control signal along line 47 will cause a high output from gate 49, causing the data selector 34 to select data from local transmit channel 35. Local data is delivered to the switch 36 along line 37. In this manner, local transmit channels may be substituted for channels in the data stream by means of control signals generated externally. The insertion of data into the output is controlled by the presence of the control pulse on line 43 and the physical presence of the transmit card. This protects the output data from the false insertion of noise when the transmit card is removed.

This overview of FIG. 1 indicates the manner in which a drop and insert scheme provides for data reception and transmission in accord with the present invention. The description and figures which follow explain the operation and circuits of FIG. 1 in more detail.

Figure 2:
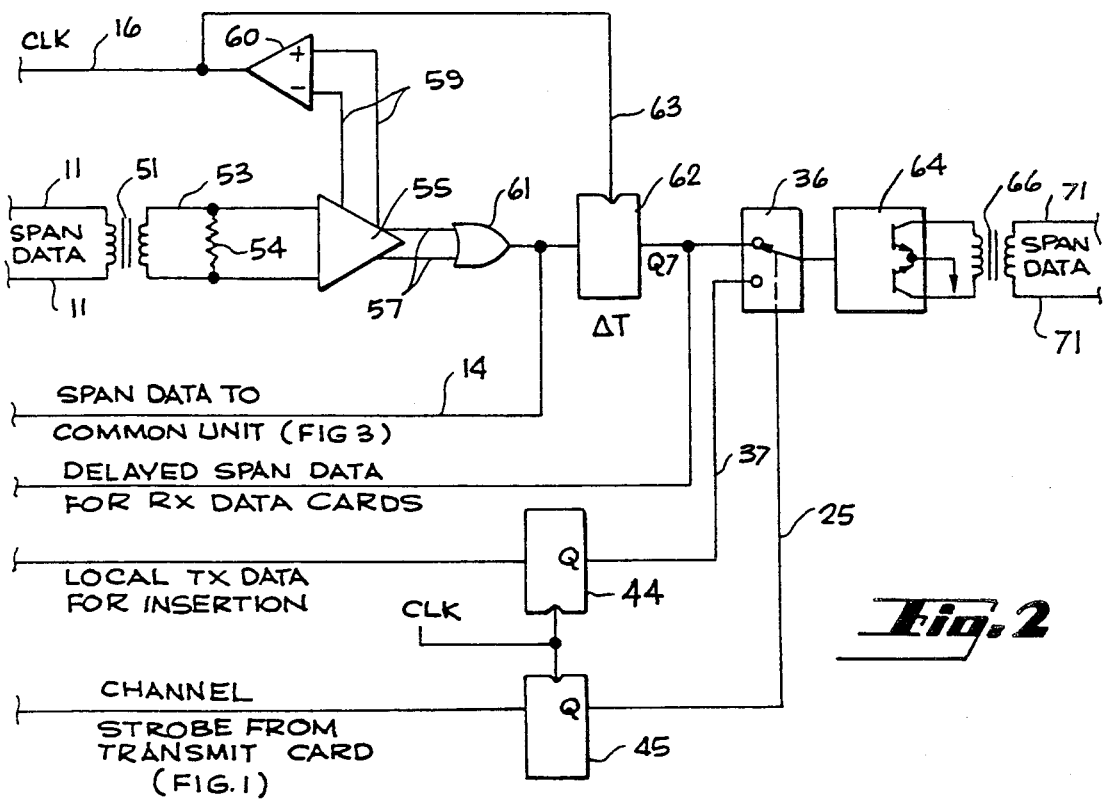
FIG. 2 is an electrical diagram of the line interface portions of the communications system illustrated in FIG. 1, together with an intervening data path between opposed communication link spans.

With reference to FIG. 2, a line interface circuit is illustrated, including the receiver unit 13, the delay circuit 19, the switch 36 and the output interface 38, all shown in FIG. 1. This line interface circuit includes an isolation transformer 51 which allows incoming data line 11 to be a balanced transmission line. Resistor 54 provides a terminating resistor for impedance matching purposes. Incoming data is fed to a T-1 repeater. Repeater circuit 55 is an LSI integrated circuit chip built for T-1 repeaters, such as type XR-C277 low-voltage PCM repeater manufactured by Exar Integrated Systems, Inc. of Sunnyvale, Calif. This chip not only is a digital repeater, but provides equalization, amplification, and extracts clock pulses at a pulse frequency equal to the data rate. The circuit should be connected in accord with instructions supplied by the manufacturer. In general, repeaters of the type shown in FIG. 2 are well known in PCM multiplex systems and the separation of a clock signal from the data signal is also known. Alternate circuits to that shown in FIG. 2 may be provided to perform the same functions. The repeater circuit 55 has two data output lines 57, carrying bipolar data, as well as data output lines 59 which carry clock pulses. The clock pulses are transmitted to comparator 60 which supplies clock pulses at TTL voltage levels for other devices. The clock pulses are synchronous with the T-1 bit stream. Data from data output lines 57 is transmitted to OR gate 61 where unipolar data pulses are formed.

Figure 3:
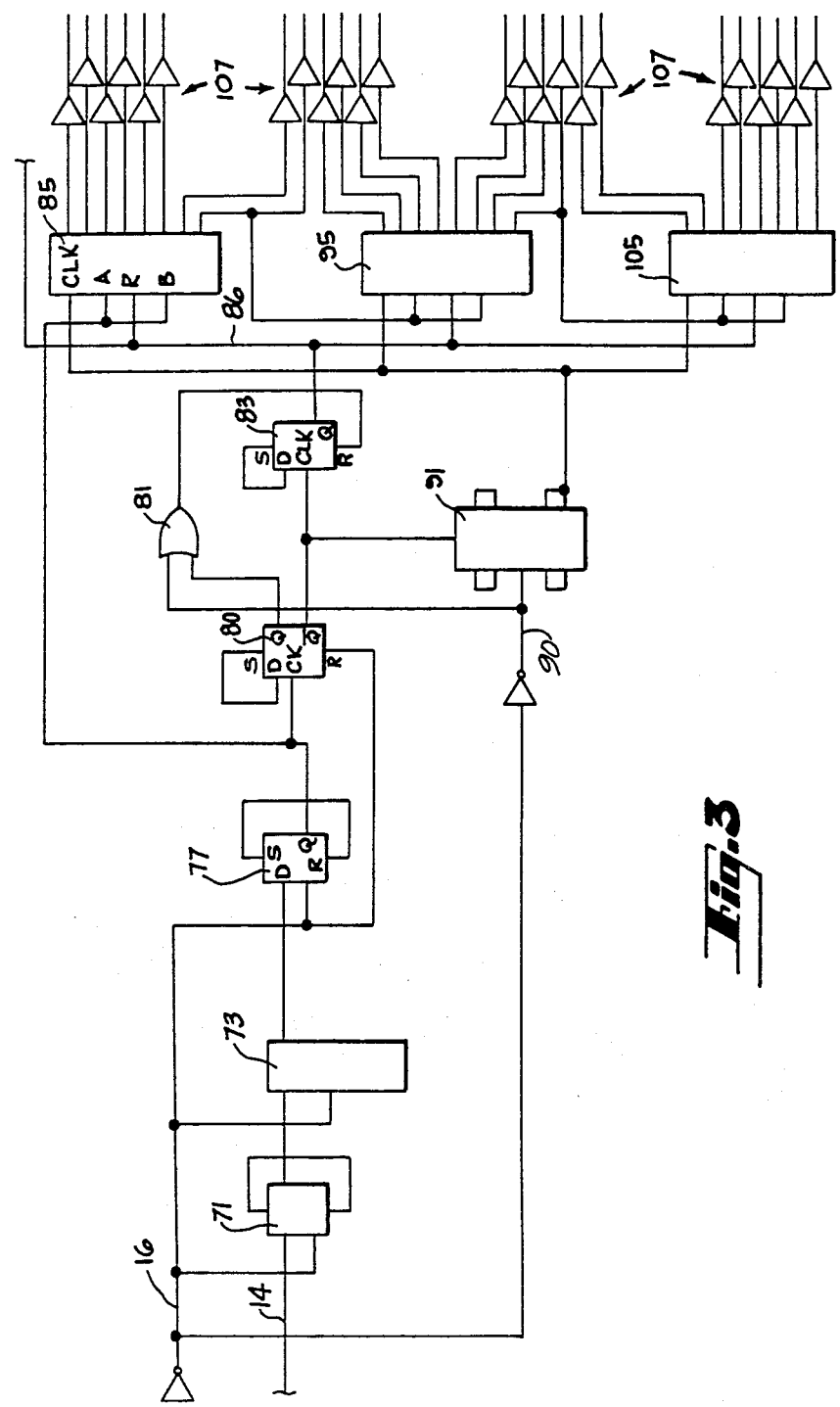
FIG. 3 is an electrical diagram of a common unit circuit card, used for generating channel strobes for operating the data switch in FIG. 2.

The unipolar data is transmitted to shift register 62 where data is delayed by a number of bits to compensate for the delay in the timing circuit of FIG. 3. This delay, termed $\Delta T$ should be less than the number of bits in a channel. We have found that a delay of seven bits achieved the desired result. Shift register 62 is clocked from the output of comparator 60, along line 63. Switch 36 is normally connected to allow delayed span data from shift register 62 to pass to the output interface 64 where the unipolar data is converted back to bipolar data.

Switch 36 may be toggled by a channel strobe pulse arriving along line 25. In that situation, the data switch 36 will be connected along line 37 to the flip-flop 44 which receives local transmit data for insertion in the data stream in the interval where a channel strobe pulse from line 25 holds the toggle in the position connecting the switch output with line 37. Flip-flop 44 provides synchronization with the clock signal generated by comparator 60. Similarly, flip-flop 45 provides synchronization of the strobe pulse with the same clock signal. Lastly, bipolar data is transmitted from the output interface unit 64 to output transformer 66 at the proper impedance level for span data which emerges along lines 71.

Generation of the channel strobe which controls switch 36 is accomplished on a common unit card illustrated in FIG. 3. In general, repeaters of the type shown in FIG. 2 are well known in PCM multiplex systems and the separation of a clock signal from the data signal is also known.

With reference to FIG. 3, span data line 14 and clock line 16 may be seen as input signals to the circuit. The span data line may be seen to be connected to D-type flip-flop 71 which is clocked at the data rate. This flip-flop serves to regenerate and retime incoming data at the clock frequency. The output from the flip-flop is connected to a receiver chip 73 which is responsive to a framing pulse which occurs once per frame in the data stream. This chip is a Rockwell 8060 LSI chip known as a T-1 receiver. The output pulse marking each frame is the input to flip-flop 77 where the framing bit is retimed at the data rate, since flip-flop 77 is clocked by clock line 16. The output from flip-flop 77 is transmitted to shift register 85 and in particular to the AB inputs which serve to initialize the shift registers 85, 95 and 105. Simultaneously, the output of flip-flop 77 is fed to flip-flop 80 which, in combination with OR gate 81 and flip-flop 83, serve to generate a reset pulse on reset line 86. Another output of flip-flop 80 is used to reset the counter 91 which is being clocked at the data rate over input line 90. Counter 91 serves to divide the clock pulses by the number of bits per channel, say, eight, and thereby helps form channel strobe pulses for the shift registers 85, 95 and 105 by clocking the registers. Each of the shift registers is eight bits wide, with the three shift registers being connected in series. If a single output corresponds to the width of one channel, the three shift registers correspond to the output of 24 channels. Once shift register 85 is initialized, clock pulses from counter 91 produce channel strobes sequentially, at each of the outputs of shift register 85, then shift register 95, then shift register 105. Each of the output lines is connected to a driver 107 for providing a higher level output power for the channel strobe pulses. Each pulse is fed to a channel receive or transmit card of the type illustrated in FIG. 1. Strobe pulses are applied to each transmit card and receive card provided for each drop and insert channel user.

Figure 4A:
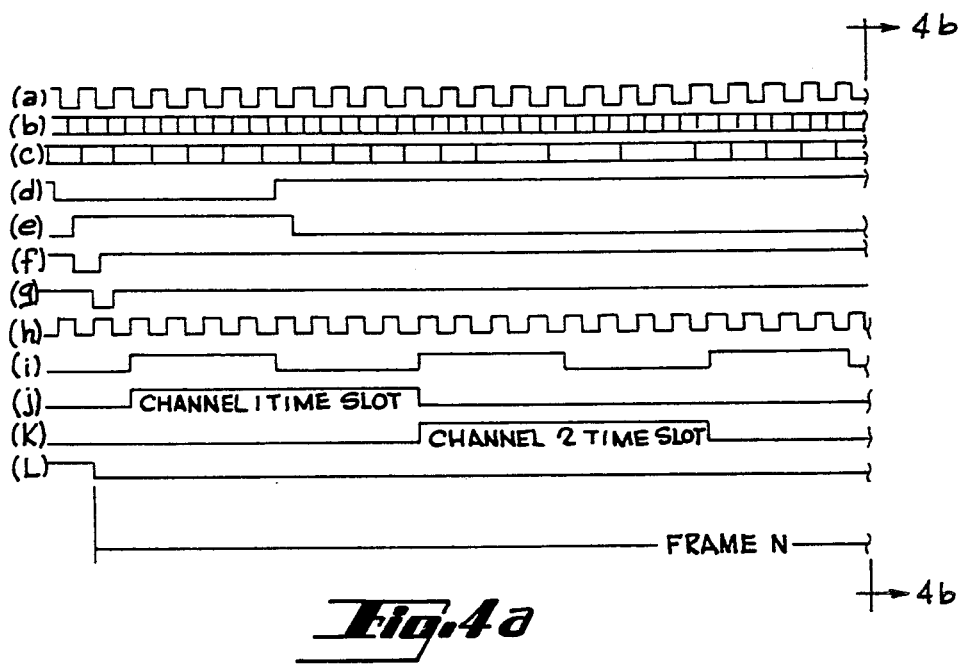
FIGS. 4a & 4b are timing diagrams for the common unit circuit card of FIG. 3.

Operation of the common unit illustrated in FIG. 3 is explained with reference to the timing diagram of FIG. 4. The first plot (a) illustrates clock pulses along clock line 16. Plot (b) illustrates incoming PCM data along line 14. Plot (c) illustrates conversion of the PCM data to NRZ data and retiming of the data at the clock rate of plot (a). Plot (d) shows the output of receiver 73, illustrating recovery of a pulse indicative of the start of a frame. Plot (e) shows the output of flip-flop 77 illustrating the synchronization of the frame pulse with the clock. This pulse is used to initialize shift registers 85, 95 and 105 and clock flip-flop 80. Plot (f) shows the frame reset pulse which is formed by flip-flop 80. This pulse is used to reset counter 91 and clock flip-flop 83. Plot (g) shows the pulse formed by flip-flop 83, in conjunction with gate 81, which is used to reset shift registers 85, 95 and 105 for each frame. Plot (h) shows an inverted clock pulse which is divided by the number of bits per channel, i.e., 8. This divide function is performed by the counter circuit 91. The output of counter circuit 91, plot (i), illustrates the channel clock which is used to clock shift registers 85, 95 and 105. The outputs of these shift registers are strobe pulses, illustrated by plots (j), (k) and (l), which correspond directly to the 24 channel slots in the PCM data stream.

Figure 4B:
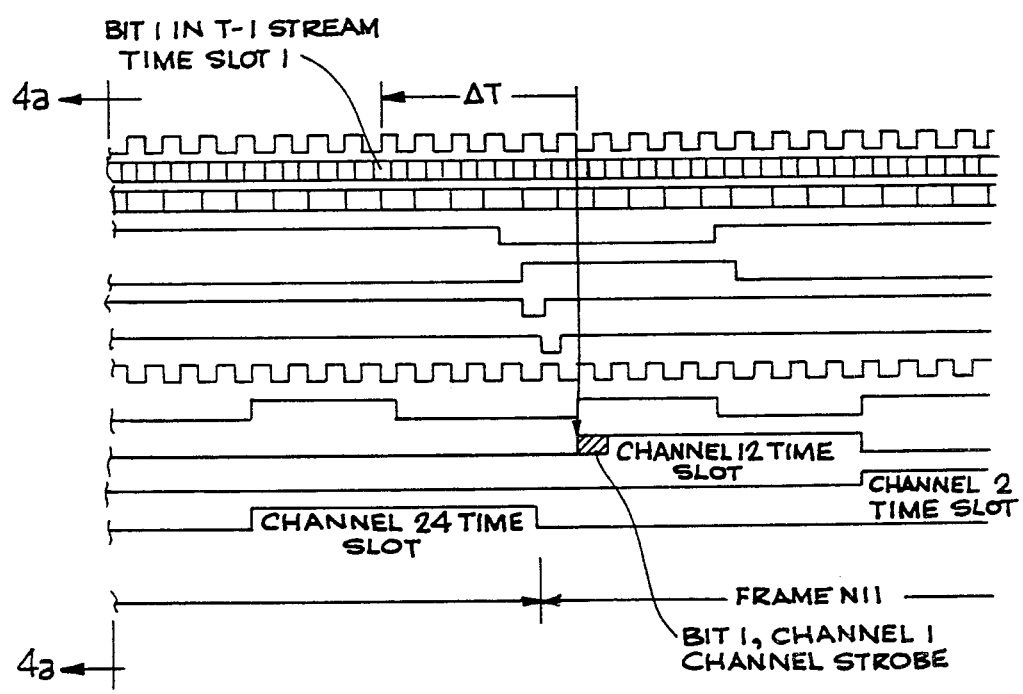

In the center of FIG. 4(b) will be seen the time delay ΔT wherein the difference in spacing between the first bit in a T-1 bit stream is shown with reference to the channel 1 strobe pulse. For this reason, the shift register 62 in FIG. 2 is used to provide a compensating delay.

Figure 5:
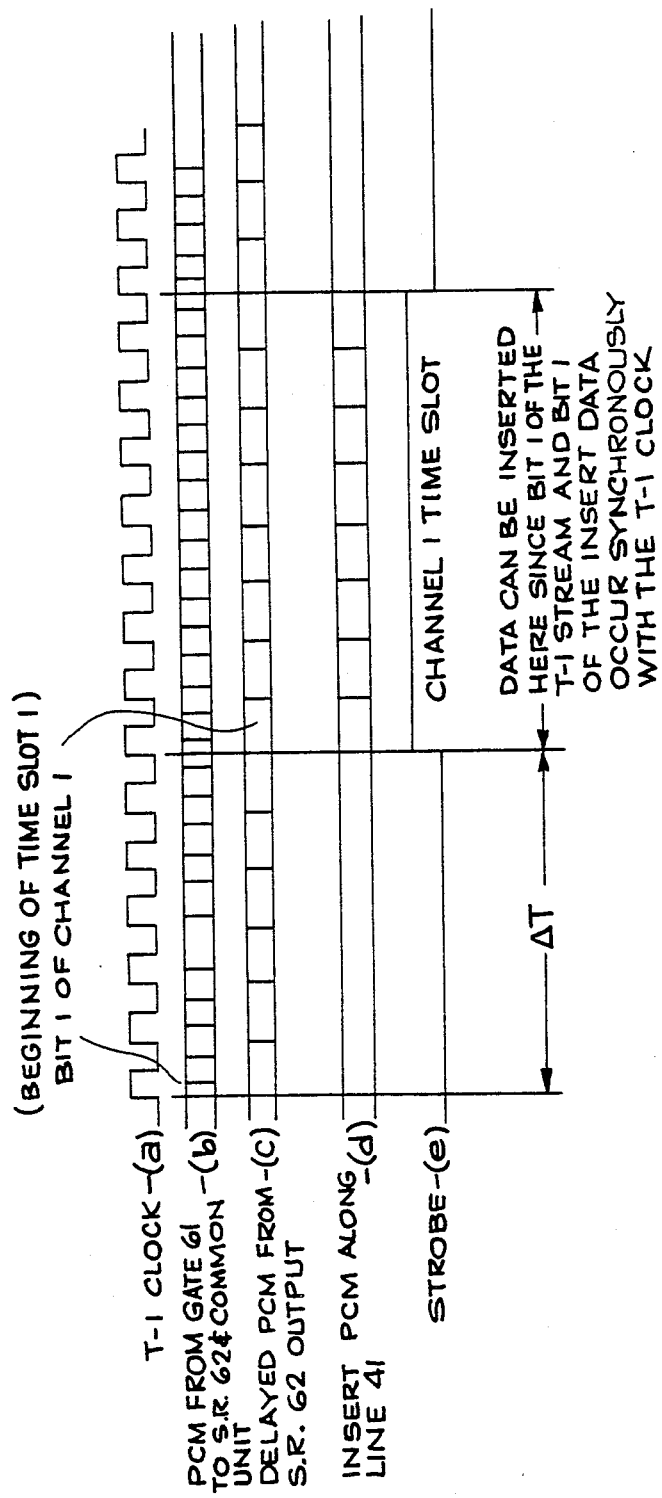
FIG. 5 is a timing diagram for data insertion in accord with FIG. 2.

With reference to FIG. 5 timing diagrams for data insertion may be seen. Plot (a) shows the clock along clock line 16 in FIG. 2. Plot (b) shows data emerging from gate 61 and being transmitted to the common unit. Plot (c) shows delayed PCM data from shift register 62. This delay data is applied to switch 36. However, the switch may be toggled by a channel strobe along line 25, as illustrated in plot (e). Such a strobe inserts data, as shown in plot (d).

One of the advantages of the present invention is that it may be used to provide communication service to remote users who have need for only limited service, such as a single communications channel. Previously, it was necessary to provide a cable from a telephone central office to such a remote user. Now, if a multiplex communication channel is proximate to the remote user, such as via microwave link, the link may be divided into two spans joined by the data switch and electrical circuits described herein. A communications channel may now be provided to the remote user at reasonable cost.

What is claimed is:

1. A digital communications unit for use between spans in a serial data communications link comprising,
    data input and output means connected to spans in a communications link carrying a multiplex digital, multi-channel, serial, data stream, each channel having a fixed time duration in a data frame, each frame marked by framing bits, the data characterized by a data frequency, said input means extracting clock pulses from the data,
    a data switch connected between the data input and output means, said switch normally connecting the data input means to said output means, said switch having a selector for selecting data from the data input means or from a local transmit channel,
    circuit means connected to said data input means for generating channel strobe pulses by counting clock pulses, with reference to the framing bits, said channel strobe pulses having a pulse width corresponding to the duration of a channel, preselected strobe pulses being transmitted to the switch,
    a local transmit channel connected to the selector and to the timing circuit means, the channel being inserted in the data stream in response to a preselected strobe pulse through the data switch whereby said inserted local transmit channel replaces any data in said communications link during said preselected strobe pulse, and
    a delay means interposed between the data input means and the switch for synchronizing serial data of the data stream with the channel strobe pulses.

2. A digital communications unit for use between first and second spans in a serial data communications link comprising,
    data input means connected to a first span of a communications link for receiving a stream of multi-channel PCM data in data frames, each frame marked by framing bits and for deriving clock and data pulses from the PCM data,
    circuit means, connected to said data input means, for generating channel strobe pulses by counting clock pulses with reference to framing bits, said strobe pulses having a pulse width corresponding to each channel of said multi-channel PCM data,
    data output means connected to a second span of a communications link for transmitting the stream of PCM data to the second span,
    at least one numbered local transmit and receive channel, each connected to the timing circuit means for receiving said channel strobe pulses, each numbered receive channel connected to the data input means and operative upon receipt of a channel strobe pulse corresponding to the number of the numbered receive channel, thereby dropping a channel of receive data from the stream of PCM data,
    a data switch connecting said data input means to said data output means in a first position and connecting a numbered local transmit channel to said data output means in a second position, said data switch having a selector means for changing the switch from the first position to the second position upon receipt of a channel strobe pulse corresponding to the number of the numbered transmit channel, thereby inserting a channel of transmit data into the stream of PCM data, and a delay means interposed between the data input means and the data switch for synchronizing serial data of the data stream with the channel strobe pulses.

3. The communications unit of claims 1 or 2 wherein said circuit means comprises a plurality of shift registers, connected in series, each shift register corresponding to channels of said stream of multi-channel data, each shift register producing a channel strobe pulse upon counting the number of data bits in a channel.

4. The communications unit of claim 3 wherein said circuit means further comprises a first flip-flop connected to said counters for converting PCM data to an NRZ format prior to entry into the shift registers and a second flip-flop connected to the first flip-flop for timing the NRZ formatted data with said clock pulses.

5. The communications unit of claim 3 wherein said circuit further comprises a pulse divider for producing counter clocking pulses at the rate of said clock pulses divided by the number of data bits in a channel.

6. The communications unit of claims 1 or 2 wherein said delay circuit is a shift register having a delay less than or equal to the number of bits in a channel.

7. The communications unit of claims 1 or 2 wherein said data switch comprises a channel strobe flip-flop with a first output connected to a first gate means for transmitting a local transmit channel upon receipt of a channel strobe pulse and a second output connected to a second gate means for suppressing the data stream upon receipt of said channel strobe pulse.

8. The communications unit of claims 1 or 2 whereifn each local transmit channel is mounted on a removable circuit card having a gate with a control line input and an output connected to the data switch selector, whereby removal of the circuit card protects the control line from noise.

9. The communications unit of claim 2 wherein said circuit means is connected to both said transmit and receive channels for transmitting strobe pulses thereto whereby a single strobe pulse enables simultaneous reception in a numbered receive channel and transmssion from a correspondingly numbered transmit channel.

10. In a drop-and-insert digital communications unit for use in a time division multiplex span having multichannel, serial data frames marked with framing bits, the span interrupted by a switch connecting an input means to a data output means, the improvement comprising, circuit means connected to the data input means, thereby receiving data frames, said data frames each marked by a framing bit, said circuit means for generating channel strobe pulses by counting clock pulses with reference to a framing bit, said channel strobe pulses having a pulse width corresponding to the duration of a channel, each channel in a frame represented by a channel strobe pulse, channel selection means connected to receive said channel strobe pulses for selecting one of the channels in data frames for drop and insert by applying a selected one of the strobe pulses to the switch connecting the data input means to the data output means in a communications span, and a delay equalization circuit means connected in the span for delaying data an amount equivalent to the circuit path delay for data travelling through the circuit means and the channel selection means.

* * * * *